Jan. 3, 1967 R. A. FUESSLE ETAL 3,295,347
APPARATUS FOR SHEARING A TUBULAR MEMBER IN ACCORDANCE
WITH A PRESCRIBED PATTERN
Filed May 12, 1965 2 Sheets-Sheet 2
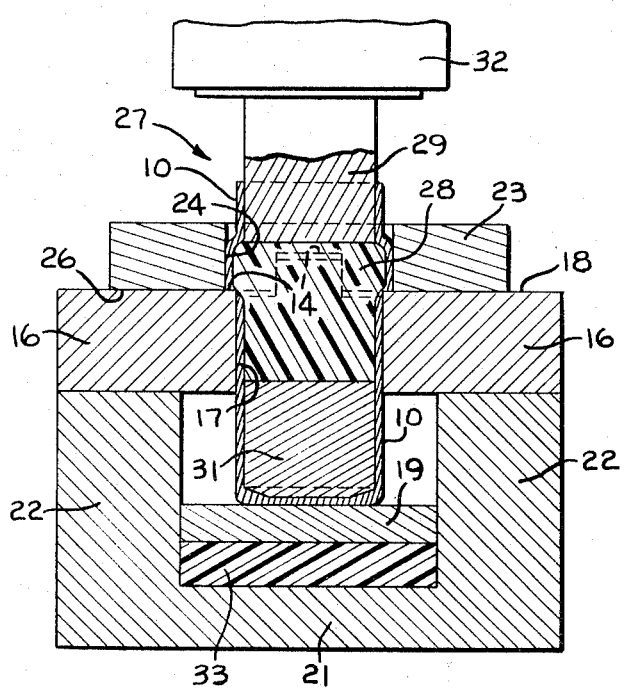
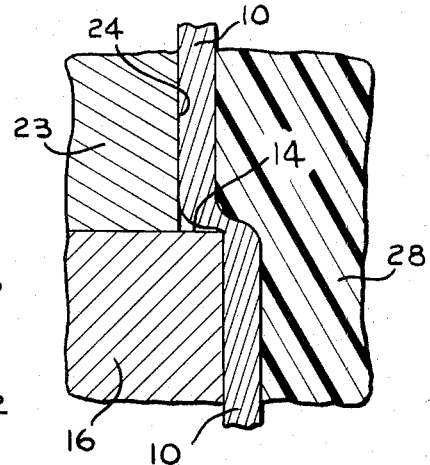
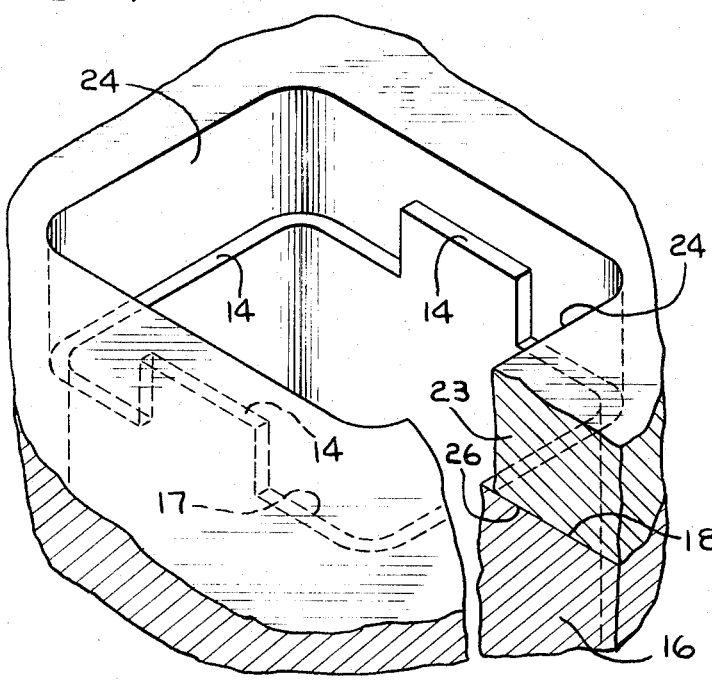
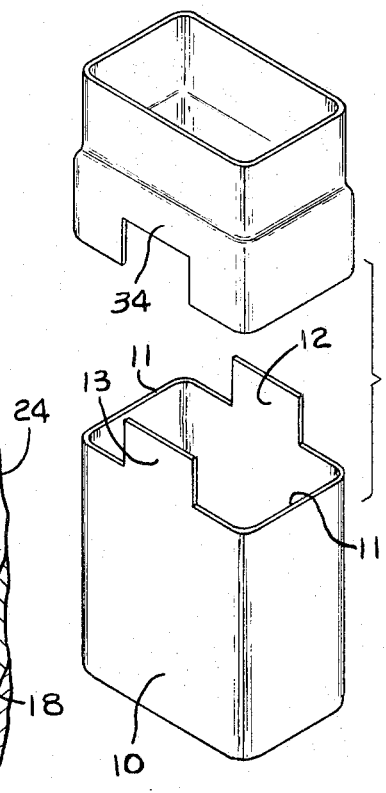

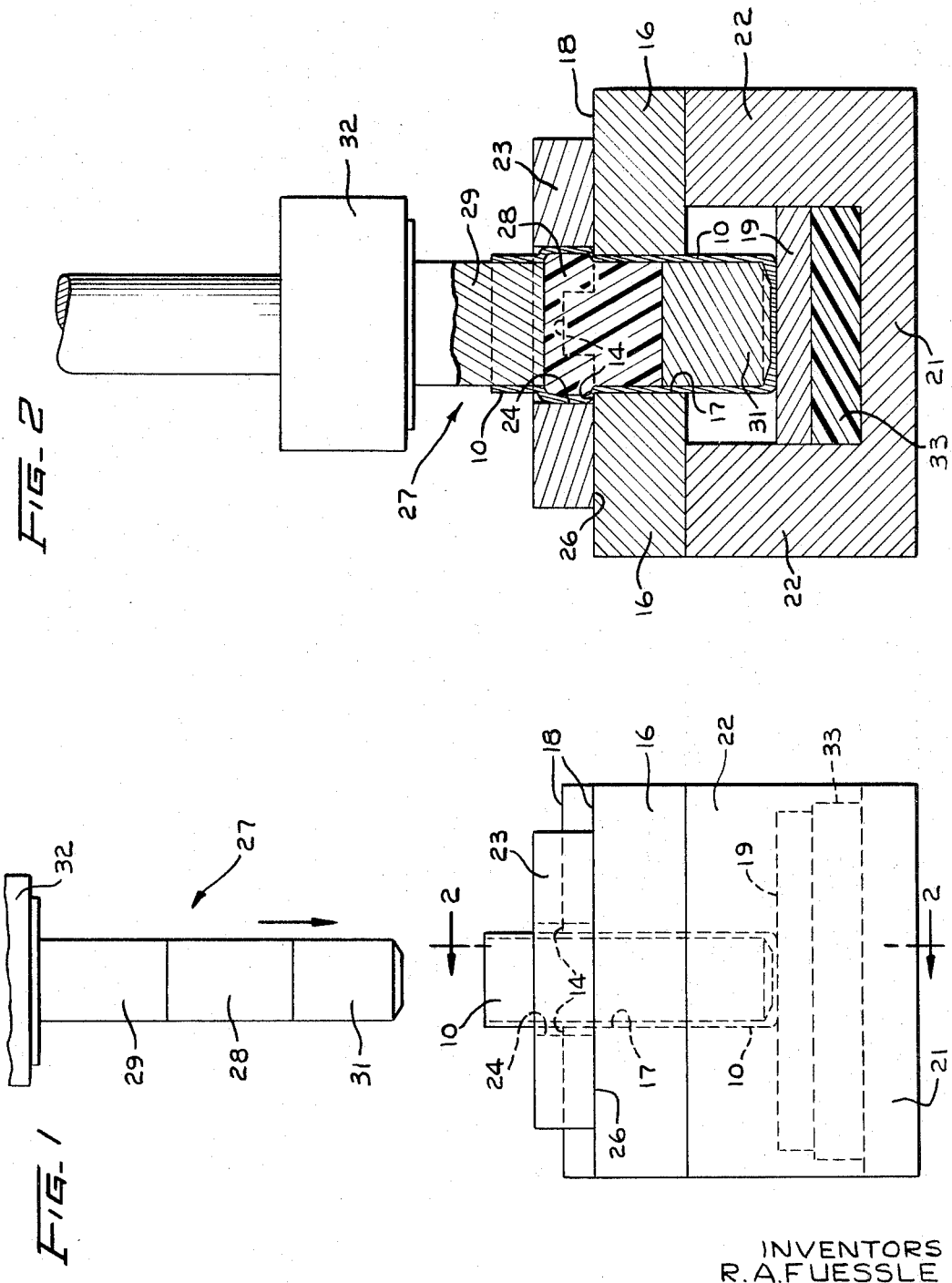

3,295,347
APPARATUS FOR SHEARING A TUBULAR MEMBER IN ACCORDANCE WITH A PRESCRIBED PATTERN
Robert A. Fuessle, Northbrook, and Raymond G. Napolski, Downers Grove, Ill., assignors to Western Electric Company, Incorporated, a corporation of New York
Filed May 12, 1965, Ser. No. 455,266
4 Claims. (Cl. 72—55)

The present invention relates generally to apparatus for shearing a member in accordance with a prescribed pattern and, more particularly, to apparatus for trimming an end portion of a tubular member or can in accordance with a prescribed pattern. Accordingly, the general objects of the invention are to provide new and improved apparatus of such character.

In the fabrication of tubular members or cans, it is often necessary that one end be trimmed in accordance with a prescribed pattern. Unfortunately, even for very simple pattern geometries, the apparatus required heretofore has often been complex. This has normally been the case because the interior walls of a tubular member to be trimmed must be supported against deformation, and the trimming mechanism must shear around or in cooperation with such interior support. Further, complex trimming geometries generally require a number of trimming mechanisms involving a plurality of moving parts which must be integrated in timed relationship. Needless to say, an apparatus which could trim a member in accordance with even a complex pattern geometry, and yet involve but a single mechanically driven part and a single operation, would prove very advantageous.

Other general objects of the invention, therefore, are to provide new and improved apparatus for shearing a member in accordance with a prescribed pattern, which apparatus employs a minimum of moving parts, and is of sturdy, yet inexpensive, construction.

Another object of the invention is to provide new and improved apparatus for shearing a member in accordance with even a complex shearing geometry, wherein the shearing pattern may be developed in such apparatus by a continuous cutting edge defined in conformity with the desired shearing geometry, and wherein new patterns or changes in the pattern may be readily effected by such apparatus without necessitating expensive changes in any moving parts of the apparatus.

More specific objects of the invention are to provide new and improved apparatus for shearing tubular members and/or cans in accordance with a prescribed pattern, which apparatus can perform even complex trimming operations, and yet involve but a single moving part and a single operation.

The invention is particularly advantageous in trimming an open end portion of an otherwise closed can—for example, cold-extruded aluminum cans utilized for the encapsulation of certain types of capacitors. Such cans must be trimmed in accordance with a prescribed pattern in order to properly accommodate and protect the capacitor body to be received therewithin. To meet high production requirements, it is necessary that such capacitor cans be trimmed in a very simple and efficient operation.

Accordingly, it is a further object of the invention to provide new and improved apparatus for trimming cans in accordance with a prescribed pattern, wherein the trimming operation may be carried out efficiently and effectively, and wherein all four walls of the can are trimmed simultaneously.

The foregoing objects and advantages are accomplished in accordance with the invention by apparatus wherein an expandable element is expanded to deform a member to be sheared over a rigid cutting edge defining the desired shearing pattern, a suitable chamber being provided to concentrate the force of expansion at the cutting edge so as to shear the member therealong. Such apparatus may be utilized to shear a tubular member by arranging the expandable element within the tubular member and constructing the cutting edge so as to surround closely the tubular member.

In a preferred application, an open end-portion of a thin walled can is trimmed by forcing a ram, composed of a deformable portion sandwiched axially between two rigid portions, into the can and against a base supporting the can. This causes the deformable portion of the ram to expand outwardly and deform the walls of the can over a cutting edge surrounding the can.

Where required, the base may be provided with a yieldable member which resists the force exerted by the ram until the walls of the can have been substantially deformed over the cutting edge, and thereafter yields to permit displacement of the closed end of the can relative to the deformed portion thereof to part the walls of the can cleanly along the cutting edge.

Other objects, advantages and aspects of the invention will become apparent from the following detailed description of a preferred embodiment thereof, when taken in conjunction with the appended drawings in which:

FIG. 1 is an elevational view of a preferred embodiment of the apparatus;

FIG. 2 is a sectional view taken generally along the line 2—2 in FIG. 1, and showing further the deformation of the walls of a can over a cutting edge;

FIG. 3 is identical to FIG. 2, showing in addition thereto the further application of force to "cold-work" the walls of the can over the cutting edge;

FIG. 4 is an enlarged, fragmentary sectional view illustrating with sharper definition the effect of the further application of force in cold-working the walls of the can over the cutting edge;

FIG. 5 is a fragmentary perspective view depicting the chamber in which the can is received, and particularly showing the cutting edge defined at the interface of a die member and a retainer plate; and FIG. 6 is an exploded, perspective view of a capacitor can trimmed by apparatus in accordance with the preferred embodiment of the invention.

With reference to the drawings, and more particularly to FIG. 6, a preferred embodiment of the invention is utilized to trim a capacitor can 10 in accordance with a prescribed pattern. In this instance, the pattern calls for trimming an open end of the can 10 to form a rectilinear edge 11 at a particular height with respect to the closed end of the can, and two mutally opposed rectangular projections 12 and 13. It is to be noted that other patterns, consisting of combinations of lines at various angles and/or curves, may be executed with equal facility by the shearing apparatus of the present invention, and that such patterns may be developed simply by forming a continuous cutting edge 14, as depicted in FIG. 5, in conformity with the desired pattern.

Turning now to FIGS. 1 and 2, the cutting edge 14 is defined by a die member 16 having an aperture 17 therein. The sharp, continuous cutting edge 14 is formed along the intersection of an upper surface 18 of the die member 16 and the aperture-defining wall surfaces thereof. At least those portions of the upper surface 18 that immediately surround the aperture 17 must be contoured vertically (i.e., in the thickness dimension) in accordance with the prescribed shearing pattern. In the embodiment shown in the drawings, the entire upper surface is contoured accordingly. It is further required that the periphery of the aperture 17 conform closely to the exterior cross-section of the can 10. This permits the die member 16 to receive the can 10 readily within the aperture 17, and at the same time to provide exterior support against outward deformation of the walls of the can.

The can 10 is initially received within the aperture 17 in the die member 16, and supported at its closed end by a support plate 19 arranged on a base 21. The die member 16 is supported by upwardly extending standards 22—22 of the base 21 so that the cutting edge 14 is located at a prescribed distance away from the support plate 19. This distance corresponds to the desired height of the trimmed can 10 relative to the closed end thereof. A retainer plate 23, mounted on the die member 16 and having an aperture 24 which communicates with the aperture 17 therein, accommodates the open end of the can 10 and constitutes an expansion chamber therefor.

More specifically, the aperture 24 in the retainer plate 23 conforms generally to the cross-section of the can 10, as may best be viewed in FIG. 5, but is slightly larger than the aperture 17 in the die member 16, so that the continuous cutting edge 14 formed by the die member 16 is exposed within the communicating apertures 17 and 24. Thus, the retainer plate permits, rather than resists, outward deformation of the walls of the can 10 adjacent the cutting edge 14.

The under surface 26 of the retainer plate 23 is designed to conform closely to the contour of the upper surface 18 of the die member 16 so that the contacting surfaces are closely meshed. As a result, a composite chamber is formed having a confining portion defined by the aperture-defining walls of the die member 16, and an expansion portion, defined by the aperture-defining walls of the retainer plate 23. The entire pile-up, including the retainer plate 23, die member 16, and base 21, may be mounted or secured in axial alignment by guide pins or fasteners (not shown).

With a can 10 supported on the base 21 and received within the die member 16 and retainer plate 23, as depicted in FIGS. 1, 2 and 3, a ram, designated generally by the numeral 27, conforming closely in cross-section to the interior configuration of the can, is inserted into the can. The ram is composed of a block of deformable material 28 (preferably Urethane Elastomer) sandwiched longitudinally between two rigid portions 29 and 31 of the ram 27, and is lowered into the can 10 by a press 32. The ram is designed so that when the rigid portion 31 thereof engages the closed end of the can 10, an intermediate portion of the deformable portion 28 is positioned adjacent the cutting edge 14. Continued lowering of the ram 27 is resisted by the plate 19 and causes compression of the deformable portion 28 between the two rigid portions 29 and 31 of the ram. The deformable portion 28 is thus forced to expand laterally outward of the ram 27 and against the walls of the can 10.

As stated above, the aperture 17 in the die member 16 conforms closely in size and configuration to the exterior of the can 10, and thus precludes any outward deformation of the wall portions of the can confined therewithin. The aperture 24 in the retainer plate 23, on the other hand, is significantly larger, and therefore permits outward deformation of the wall portions accommodated therewithin. Expansion of the deformable member 28 is therefore confined only to the wall portions of the can 10 accommodated within the retainer plate 23. The rigid compressing portions 29 and 31 of the ram 27 of course preclude any axial expansion of the deformable portion 28.

With this construction, therefore, the initial expansion of the deformable portion 28 of the ram 27 is confined to the cross-sectional dimensions of the aperture 24 in the retainer plate 23. Such aperture preferably is only 1 to 10 wall thicknesses of the can greater in each dimension than the aperture 17 in the die member 16. This limits the outward deformation of the can 10 so that the resistance offered by the retainer plate 23 to further deformation, in effect, ultimately concentrates the still increasing force of expansion of the deformable member 28 at the cutting edge 14.

This concentration of force results because the wall portions immediately adjacent the cutting edge 14 offer the greatest resistance to deformation during initial expansion of the deformable ram-portion 28, and hence these wall portions are merely "rounded over" at the cutting edge 14, as best seen in FIG. 4. However, upon continued expansion of the deformable ram-portion 28, the aperture-defining walls of the retainer plate 23 eventually offer the greatest resistance to deformation, and the wall-portions of the can 10 adjacent the cutting edge 14, which are not yet fully deformed, offer the least resistance; hence, the force of expansion is concentrated at the cutting edge 14.

The resulting concentration of the force at the cutting edge 14 actually cold works the walls of the can 10, by drawing the metal tightly over the cutting edge, until the edge either severs the wall portion adjacent thereto or at least substantially reduces the thickness thereof, as may be best viewed in FIG. 4.

With most metals which are cold-workable, this concentration of force is sufficient to shear the walls of the can 10 completely, and the open end of the can is thus trimmed in accordance with a prescribed pattern. However, in this preferred embodiment, to make absolutely certain that the walls of the can 10 are completely severed, a yieldable member 33 (also preferably formed of Urethane Elastomer) is provided in the base 21 intermediate the support plate 19 and the base 21, as shown in FIGS. 2 and 3. The resilient material from which the yieldable member 33 is fabricated is chosen to be substantially "harder" than the material from which the deformable portion 28 of the ram 27 is formed. That is, the yieldable member 33 is fabricated of a material having sufficient hardness to resist, without yielding, the necessary forces exerted by the ram 27 for the deformation and at least partial shearing of the walls of the can 10.

The yieldable member 33 thus remains substantially rigid during such deformation to allow the walls of the can 10 to be sheared substantially clear through, in the manner indicated above, before the yieldable member actually yields. Thereafter, however, the continued application of an increasing force on the ram 27 causes the yieldable member 33 to yield. This permits the ram 27 to physically displace the closed end of the can relative to the deformed portion 34 thereof (FIG. 6), thus parting the walls of the can cleanly along the cutting edge 14 in accordance with the prescribed pattern.

It is thus apparent that the present invention provides a new and improved apparatus embodying numerous advantages for shearing a member in accordance with a prescribed pattern. In the preferred embodiment described hereinabove, apparatus is provided for efficiently and effectively trimming a capacitor can. For that application, the can is trimmed in a single operation wherein all four walls are sheared simultaneously. Another advantageous feature exhibited by such apparatus is the effectuation of such trimming operation with but a single mechanically driven part—namely, the ram 7.

It is to be emphasized, however, that though a preferred embodiment is described hereinabove, the invention is not limited in breadth to the specific apparatus disclosed. The invention broadly encompasses the expansion of an expandable element, concentrated along a cutting edge within a chamber, to deform and shear a member along the cutting edge in accordance with a prescribed pattern. Thus, while a ram composed of a deformable material is disclosed, a number of other expandable elements may be encompassed by the invention. For example, a bladder may be utilized which is expanded by hydraulic or pneumatic pressure.

Further, the invention is not intended to be limited to embodiments wherein a yieldable member is provided in the base. The yieldable member 33 disclosed, yields only under the application of forces in excess of those necessary to deform the walls of the can over the cutting edge, and for most cold-workable materials, this deformation alone is sufficient to complete shearing operation. However, the yieldable member may be advantageously employed in shearing articles with relatively thick walls and/or of high tensile strength metals, and also in facilitating the execution of very complex shearing patterns.

Thus, while one preferred embodiment of the invention has been described in detail hereinabove, various modifications, of which those specifically considered are merely exemplary, may be made without departing from the true spirit and scope of the invention, and it is intended that all such modifications be construed as within the contemplation of the present invention.

What is claimed is:

1. Apparatus for trmming a thin-walled can, open at one end, in accordance with a prescribed pattern, which comprises:
    a base for supporting the closed end of the can, at least a portion of said base being yieldable upon the application of substantial pressure thereagainst by the can;
    a die mounted on said base, and defining a chamber aligned with said yieldable portion of said base and conforming closely to the outer surface configuration of the can, the interior walls of the chamber terminating at one end of said die, remote from said base, in a sharp continuous cutting edge defined in accordance with the prescribed trimming pattern;
    a retainer plate having one end conforming to the configuration of and arranged in engagement with said one end of said die, said retainer plate defining an aperture communicating with and larger in cross-section than the chamber in said die so that a continuous shoulder is formed along the plane of said cutting edge at the interface of said die and said retainer plate; and
    a ram conforming closely to the inner cross-section of the can for slidable reception therewithin, at least a portion of said ram being composed of a substantially deformable material which is free to expand laterally outward of said ram upon being subjected to a transverse compressive force, said deformable portion being arranged adjacent said cutting edge when said ram engages the closed end of a can supported by said base;
    said yieldable portion of said base being substantially more rigid than said deformable portion of said ram so that said yieldable portion yields only to forces applied to said ram which are substantially greater than those sufficient to expand said deformable portion and deform the walls of the can over said cutting edge, and then said yieldable portion yields only to permit said ram to displace the closed portion of the can relative to the deformed portion by a distance sufficient to part the walls of the can cleanly along said cutting edge of said die in accordance with the prescribed pattern.

2. The apparatus as recited in claim 1, wherein:
    the base comprises a substantially rigid supporting structure, a plate and a yieldable member formed of resilient material, said yieldable member being arranged between opposed surfaces of said plate and said supporting structure, and said plate forming the supporting surface for the can and being free to move toward said supporting structure when the yieldable member yields; and
    the ram is composed, further in part, of two substantially rigid portions arranged axially on opposite sides of the deformable portion, said rigid portions subjecting the deformable portion to compression when axial movement of the ram into the can is resisted.

3. The apparatus as recited in claim 1, wherein:
    the aperture in the retainer plate is approximately one to ten wall-thicknesses of the can greater in each dimension than the cross-sectional area of the chamber in the die member, whereby the force of expansion of the deformable portion of the ram is concentrated at the wall portions of the can adjacent the cutting edge when the interior walls of said retainer plate resist further outward deformation of walls of the can.

4. Apparatus for trimming a thin-walled can, open at one end, in accordance with a prescribed pattern, which comprises:
    a base for supporting the closed end of the can, at least a portion of said base being yieldable upon the application of substantial pressure thereagainst by the can;
    means defining a rigid cutting edge conforming to the prescribed trimming pattern and dimensioned to surround closely the can;
    means arranged intermediate said base and said cutting edge for supporting the corresponding wall portions of the can adjacent said cutting edge against outward deformation;
    means arranged adjacent to and on the opposite side of said cutting edge from said supporting means, defining an expansion chamber about the can for permitting limited outward deformation of the corresponding wall portions of the can over said cutting edge;
    a ram conforming closely to the inner cross-section of the can for slidable reception therewithin, at least a portion of said ram being composed of a substantially deformable material which is free to expand laterally outward of said ram upon being subjected to a transverse compressive force, said deformable portion being arranged adjacent said cutting edge when said ram engages the closed end of the can supported by said base;
    said yieldable portion of said base being substantially more rigid than said deformable portion of said ram so that said yieldable portion yields only to forces applied to said ram which are substantially greater than those sufficient to expand said deformable portion and to deform the walls of the can over said cutting edge, said yieldable portion when subjected to yielding permitting said ram to displace the closed portion of the can relative to the deformed portion by a distance sufficient to part the walls of the can cleanly along said cutting edge in acordance with the prescribed trimming pattern.

References Cited by the Examiner

UNITED STATES PATENTS 2,966,872   1/1961   Schmocker.

ANDREW R. JUHASZ, *Primary Examiner.*